Figure 1:
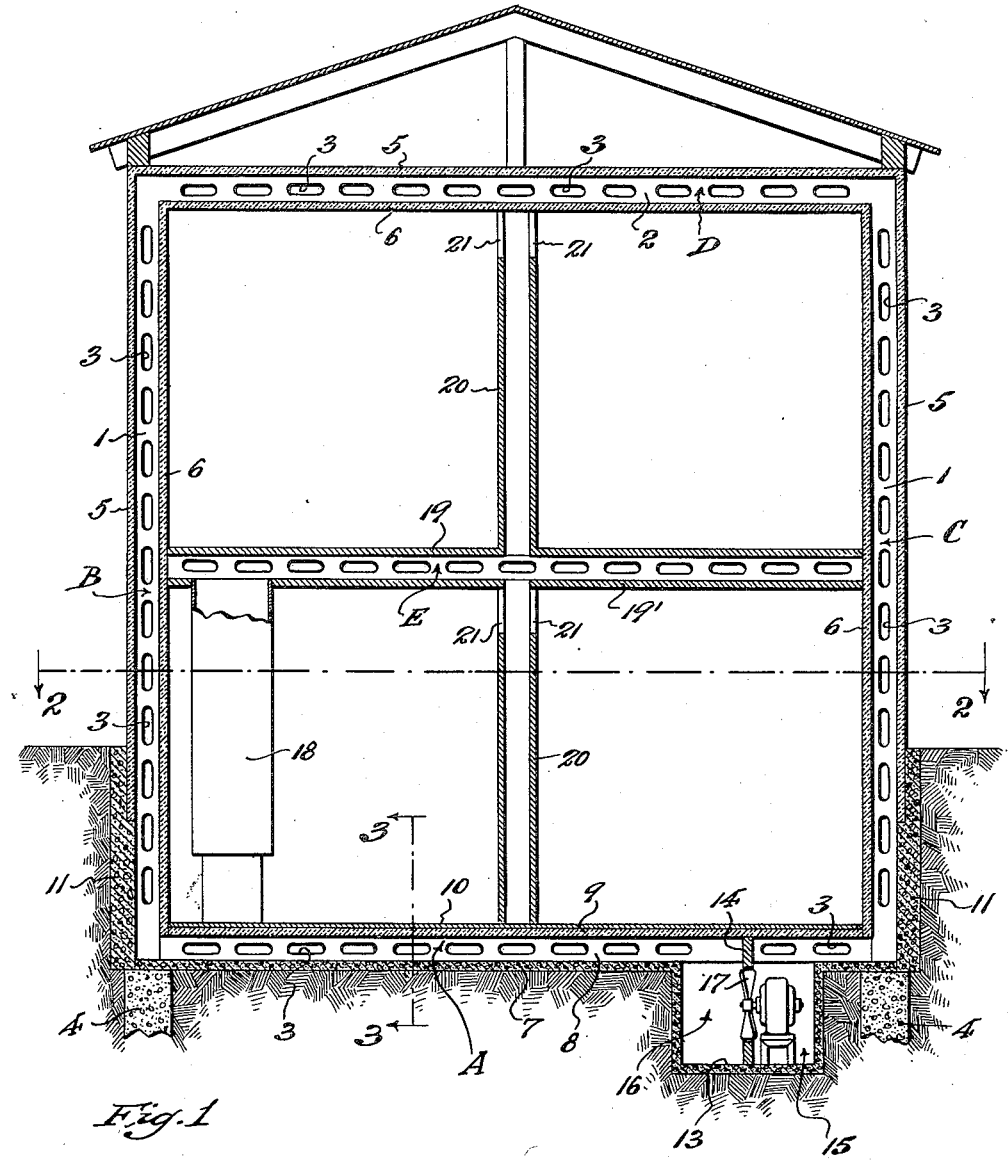

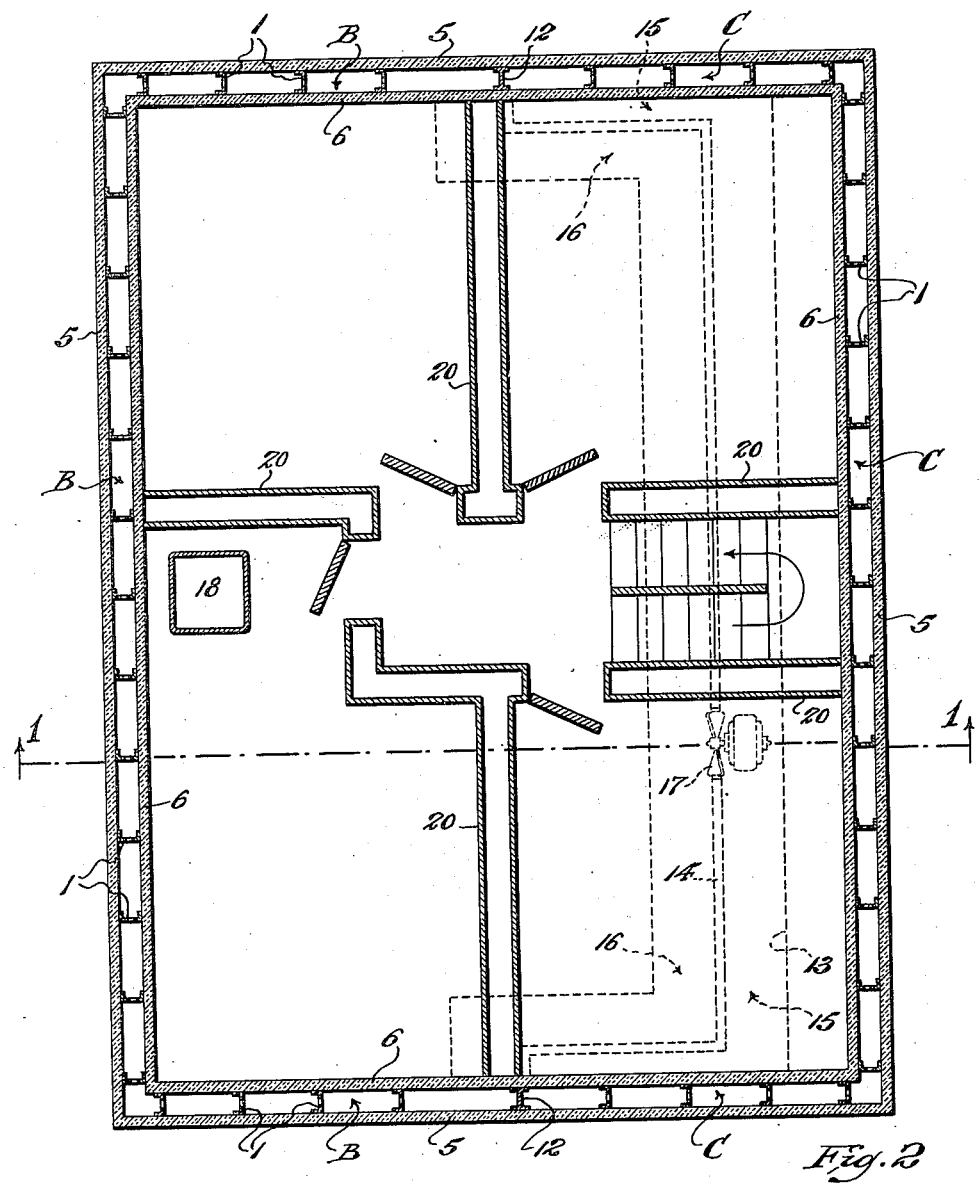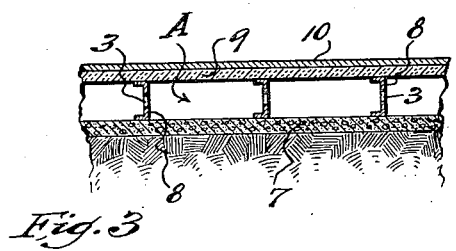

Patented July 10, 1951

2,559,868

UNITED STATES PATENT OFFICE 2,559,868

HOUSE STRUCTURE ADAPTED FOR INTERIOR TEMPERATURE CONTROLS

Frazer W. Gay, Metuchen, N. J.

Application August 25, 1948, Serial No. 46,104

1 Claim. (Cl. 237—50)

This invention relates to an improved house structure adapted for interior temperature control; and the invention has reference, more particularly, to a novel house structure which requires minimum expenditure of energy during periods of extreme cold weather, such as occur for example in the neighborhood of metropolitan New York city.

The invention has for an object to provide a novel cellarless house structure, the entire interior of which can be used for living quarters, with comfortable inhabitable rooms on both the ground and upper floors, capable of being so arranged e. g. as to provide, when of small size, living room, dining room, kitchen and bath on an upper floor, and bedrooms on the ground floor; the house structure being so constructed that its exposed walls are adapted to provide envelope forming passages through which air can be circulated with interior temperature controlling effect.

The invention has for a further object to provide a house structure as above characterized wherein the wall construction comprises spaced inner and outer insulating walls which define the air circulating passages through which air may be circulated to pass through a relatively warm heat storage zone so that temperature variations of said air change but little relative to wide variations in outdoor temperature, and consequently the heat demand on a heating furnace or other house heating source in extremely cold weather is substantially reduced.

Another object of the invention is to provide a novel house structure built with metallic studs and beams which support an inner wall of heat insulating material, which bounds the house interior, and an outer wall of fireproof heat insulating material above ground level having a section below ground level made of fireproof heat conductive material; said inner and outer walls, as spaced by the studs and beams, defining an envelope of recirculating air including portions contiguous to the earth so that heat may be transmitted to and stored in said earth in warm weather, and said stored and thus conserved heat returned to the recirculating air in extremely cold weather from which it may pass through the outer wall, whereby to increase the thermal drop in latter, and thus reduce the heat demand upon a heating furnace or other house heating source.

Other objects of this invention, not at this time more particularly enumerated, will be understood from the following detailed description of the same.

An illustrative embodiment of a house structure according to this invention is shown in the accompanying drawings, in which:

Fig. 1 is a transverse vertical sectional view of the house structure, taken on line 1—1 in Fig. 2; Fig. 2 is a horizontal sectional view of the same, taken on line 2—2 in Fig. 1; and Fig. 3 is a fragmentary cross sectional view, taken on line 3—3 in Fig. 1, but drawn on a somewhat enlarged scale.

Similar characters of reference are employed in the hereinabove described views, to indicate corresponding parts.

Referring to the drawings, the reference character 1 indicates the wall studs of the building structure, and 2 the beams which support the upper floor ceiling and roof. Said studs and beams are preferably of channel form produced from steel, aluminum or other suitable metallic material. The webs of said studs and beams are punched to provide spaced openings 3 extending along their neutral axes throughout the lengths thereof. The studs 1 are supported on footings 4 which are countersunk in earth below ground level. Supported by the studs and beams 1 and 2 is an outer wall which completely surrounds the sides and top of the building above ground level. Said outer wall 5 is formed from a material having desirable heat insulating characteristics, such e. g. as vermiculite plaster or similar material. Said vermiculite plaster is applied to metal or other lath (not shown) which is affixed to the outer flanges of studs 1 and beams 2; such application may be made by hand or gunned into place. An inner wall 6 of like material and construction is mounted on the inner flanges of the studs 1 and beams 2. The walls 5 and 6, as spaced by the studs and beams, define an intermediate air passage envelope which surrounds the building interior.

The side wall structure is extended downwardly below ground level or grade so that the outer side walls 5 extend below frost line; usually for a distance of at least two feet. Within the side wall structure as thus extended the earth is excavated to suitable depth. Contiguous to the subterranean extension of the side walls 5 is arranged a body 11 of concrete or cement of high thermal conductive characteristics, which extends downward to the floor of the excavated interior. Said body 11 is made of suitable thickness, and serves in lieu of a foundation. The concrete or cement body 11 contributes to transfer of heat from the earth to the air circulating within the wall structure envelope.

A concrete base floor 7 of suitable thickness is laid directly upon the earth within the building interior. Laid on this floor 7, to extend between studs 1 at opposite sides of the building structure, are sleepers 8. These sleepers 8 may be of either channel or I-beam form, and are preferably made of steel. Supported by said sleepers 8 is an interior flooring 9, which preferably comprises a two inch layer of vermiculite concrete, over which is laid a surfacing floor 10, which may be of standard concrete, asphalt, tile or other material adapted to furnish suitable wearing surface. The intervening space between the base floor 7 and interior flooring 9 extends between said opposite sides of the building structure so as to provide a bottom air flow course A in communication with the air circulating envelope formed in the side and top wall structures. The webs of said sleepers 8 are punched to provide spaced openings 3 extending along the same, similarly as is done with respect to the studs 1 and beams 2, whereby communication is established between the parallel air flow channels intermediate said studs, beams and sleepers.

The part of the air circulating envelope provided by the side wall structure is subdivided by imperforate studs 12 preferably located within the front and back sections of said side wall structure, whereby to form, in one half of the side wall structure, a rising air flow course B, and, in the opposite half thereof a descending air flow course C; communication between the rising and descending courses being established through the upper horizontal part of the air circulating envelope which is defined by the beams 2, and which provides a transfer air flow course D.

Countersunk in the base floor 7 below one-half of the building, to extend between the front and back of the latter, as shown, is a duct 13. This duct is subdivided along its length by a partition 14, whereby to provide an air receiving chamber 15, with which the descending air flow course C communicates through one end of the bottom air flow course A, and an air discharging chamber 16, which communicates with the rising air flow course B through the opposite end of said bottom air flow course A. Mounted in the partition 14 is a reversible motor driven air impeller fan 17, which moves the air from the receiving chamber 15 to the discharging chamber 16, or vice versa at will.

Suitably located within the lower storey of the building is a furnace 18 or other suitable heat generator. Hot air is delivered from the furnace or generator into passage space E between the floor 19 of the upper storey and the ceiling 19' of the lower storey of the building, being distributed thence through the hollow partitions 20 which define the rooms of each storey, for discharge, through registers or other outlets 21, into said rooms. Any suitable means may be provided for returning cold air to the furnace or heat generator.

In cold weather, the fan 17 drives air from the discharging chamber 16 through the bottom air flow course A, thence upwardly through the rising air flow course B, across the transfer air flow course D, and downwardly through the descending air flow course C to the receiving chamber 15. If it is extremely cold out doors, the air moving through the bottom air flow course A in contact with the earth supported base floor 7 picks up heat from the contiguous earth mass, since underground temperature is considerably higher than ambient temperature under cold weather conditions. Illustrative of this, extensive tests show that underground temperatures in the neighborhood of metropolitan New York city, e. g. average about 50° F., and this temperature changes but little throughout the year for depths in excess of ten feet. The heat transferred to the air from the earth is dissipated as the air is circulated through the envelope by which the building is surrounded. In warm weather the air impeller fan may be reversed, so that heat from the circulated air, in passing through the bottom air flow course A, may be transferred to the relatively cooler contiguous earth mass, and thus by such reverse circulation through the air flow courses of the envelope, producing a lowering effect upon the building interior temperature.

From the above it will be obvious that the novel building structure provides a thin envelope of recirculating air which surrounds the building interior, a portion of which envelope is contiguous to the earth so as to promote the transfer of heat to and from the air from and to the earth upon relatively slight temperature differential. In warm winter weather (above 30° F.), the heat passes from the recirculating air into the earth, thus increasing the normal flow of heat from the interior of the building across the inner heat insulating wall 6, so that this increment of heat is largely stored in the underlying ground. In cold winter weather (approximating zero), the stored heat passes from the ground into the recircuating air, and thus greatly reduces the drain on the heating furnace or generator, so as to economize operation of the latter.

The heating operations in the novel building structure are substantially as follows: to maintain an interior temperature of approximating 72° F.

Assuming the normal average outdoor temperature to approximate 30° F. (as e. g. in the metropolitan New York city area), and that the outer wall 5 of the air envelope possesses a heat conductivity approximating 1000 B. t. u. per hour per degree F., and that the inner wall 6 of said air envelope also possesses a heat conductivity approximating 1000 B. t. u. per hour per degree F.; the air within the envelope would normally possess a mid temperature of $$\frac{30 \text{ plus } 72}{2} \text{ or } 51° \text{ F.}$$

which is the mid-temperature between outdoor and indoor air, and the drop across the inner wall 6, from heat supplied by furnace 18, would be 21° F., i. e. the furnace 18 would be required to produce an output of approximately 21×1000 or 21,000 B. t. u. per hour. However, if the normal earth temperature is 50° F., some heat would be stored in the ground, and the furnace 18 would have a somewhat higher output. For outdoor temperatures higher than 30° F. (e. g. a maximum of 60° F.), the envelope air would normally tend to possess an average temperature of approximately $$\frac{60 \text{ plus } 72}{2} \text{ or } 66° \text{ F.}$$

which is the mid-temperature between outdoor and indoor air, and the furnace would only supply 6×1000 or 6000 B. t. u. per hour. However, the earth can be expected to store heat, transferred thereto from the envelope air, and thus to maintain an envelope air temperature of approximately 55° F., so that the furnace need only supply 17×1000 or 17,000 B. t. u. per hour. Under these circumstances, the drop across the outer wall 5 will approximate 5° F. negative, so that 5×1000 or 5000 B. t. u. will be transferred to the earth from out doors, thus a total heat storage in the ground of 17,000 plus 5000 or 22,000 B. t. u. per hour will be accumulated. The conducting underground wall 11 absorbs over 4000 B. t. u. per degree F.

At zero outdoor temperature, without considering earth storage heat, the envelope air would possess a temperature of $$\frac{0 \text{ plus } 72}{2} \text{ or } 36° \text{ F.}$$

and the furnace 18 would be required to supply 36×1000 or 36,000 B. t. u. If however T is assumed to be the temperature of the envelope air, then $(72-T) \times 1000$ equals output of the furnace, and $T \times 1000$ equals heat passing through outside wall 5 and $T \times 1000 - (72-T) \times 1000$ is the amount of heat desired from ground storage. If the ground is assumed to yield 4000 B. t. u. per degree F. of variation above 50° F., then $(50-T) \times 4000$ equals available storage heat, said $T \times 1000 - (72-T) \times 1000 = (50-T) \times 4000$ and T equals approximately 45⅓° F., so that ground stored heat will supply about 4⅔×4000 or 18,700 B. t. u. per hour, of the 45,300 B. t. u. required, leaving but approximately 26,600 B. t. u. necessary to be supplied by the furnace 18, instead of the 36,000 B. t. u. normally needed, thus effecting a saving in furnace capacity required of 9,400/36,000 or about 26 per cent. The above assumes that suitable means is provided to avoid substantial heat loss through windows and doors.

I am aware that changes could be made in the above described building structure, and that many differing embodiments of my invention could be made without departing from the scope thereof as defined in the following claim. It is therefore intended that all matter contained in the foregoing description or shown in the accompanying drawings shall be interpreted as illustrative and not in a limiting sense.

I claim:

A house structure comprising external side, top and bottom wall structures having spaced outer and inner walls adapted to provide an air circulating envelope surrounding the entire interior of the house, a heat generating means within the house interior, those areas of said outer wall contiguous to and in contact with the earth being of heat conductive character, whereby to promote transfer of heat between the contiguous earth and air circulating through said envelope, air impulsion means to induce air flow through said envelope, whereby heat from the heat generating means is carried to the earth by the circulating air for storage in said earth during warm weather, thus conserving the output of the heat generating means, while in extremely cold weather the stored heat is returned to the circulating air to increase its temperature and thus reducing the output demanded on the heat generating means.

FRAZER W. GAY.

REFERENCES CITED

The following references are of record in the file of this patent:

UNITED STATES PATENTS

| Number | Name | Date |
|---|---|---|
| 213,138 | Shepard | Mar. 11, 1879 |
| 1,086,031 | Davis | Feb. 3, 1914 |
| 1,168,304 | Hellstrom | Jan. 18, 1916 |
| 1,371,949 | Tracy | Mar. 15, 1921 |
| 2,181,814 | Knapp | Nov. 28, 1939 |
| 2,192,567 | Waugh | Mar. 5, 1940 |
| 2,210,960 | St. Pierre | Aug. 13, 1940 |
| 2,364,220 | Johnson | Dec. 5, 1944 |
| 2,422,685 | Keck | June 24, 1947 |
| 2,465,184 | Alderman | Mar. 22, 1949 |

FOREIGN PATENTS

| Number | Country | Date |
|---|---|---|
| 875,411 | France | Sept. 21, 1942 |
| 875,412 | France | Sept. 21, 1942 |